(12) United States Patent
Higgins

(10) Patent No.: US 11,533,726 B2
(45) Date of Patent: Dec. 20, 2022

(54) WIRELESS REMOTE MONITORING SYSTEM AND DATA COLLECTION AND CONTROL AND METHOD OF USING THE SAME

(71) Applicant: James A. Higgins, Chico, CA (US)

(72) Inventor: James A. Higgins, Chico, CA (US)

(73) Assignee: Digital Path, Inc., Chico, CA (US)

( * ) Notice: Subject to any disclaimer, the term of this patent is extended or adjusted under 35 U.S.C. 154(b) by 125 days.

(21) Appl. No.: 17/249,109

(22) Filed: Feb. 19, 2021

(65) Prior Publication Data

US 2021/0176753 A1 Jun. 10, 2021

Related U.S. Application Data

(63) Continuation-in-part of application No. 16/442,249, filed on Jun. 14, 2019, now Pat. No. 11,006,297.

(51) Int. Cl.
| | |
|---|---|
| *H04W 84/18* | (2009.01) |
| *H04W 24/02* | (2009.01) |
| *H04B 1/71* | (2011.01) |
| *H04W 4/02* | (2018.01) |
| *H04W 24/04* | (2009.01) |
| *H04W 88/16* | (2009.01) |
| *H04W 72/04* | (2009.01) |
| *H04B 1/713* | (2011.01) |
| *H04W 4/029* | (2018.01) |

(52) U.S. Cl.
CPC ........ *H04W 72/0453* (2013.01); *H04B 1/713* (2013.01); *H04W 4/029* (2018.02); *H04W 24/04* (2013.01); *H04W 84/18* (2013.01); *H04W 88/16* (2013.01)

(58) Field of Classification Search
CPC ... H04W 84/18; H04W 24/029; H04W 24/04; H04W 88/16; H04B 1/713
See application file for complete search history.

(56) References Cited

U.S. PATENT DOCUMENTS 6,199,068 B1 * 3/2001 Carpenter .............. G01D 4/004
7,602,702 B1 * 10/2009 Aggarwal ............... H04L 45/28
709/239

(Continued)

*Primary Examiner* — Ayanah S George
(74) *Attorney, Agent, or Firm* — FisherBroyles, LLP; Rob L. Phillips

(57) ABSTRACT

System and method for collection, control and wireless transmission of environmental and other data. Nodes may wirelessly connect to other nodes to relay node specific information, collected sensor data or commands to and from other nodes and gateway nodes linked to a central database. Nodes in gateway mode may be capable of aggregating and relaying commands and data between other nodes and a centralized database. Nodes may bypass other nodes and/or gateway nodes and communicate directly with the central database via satellite or cellular link. Nodes may be self-contained devices, inclusive of a wind or solar power source and a battery, eliminating the need for an external power source. Nodes may be configured independently or as a system to monitor and control various types of equipment including utility lines or water systems or used to collect environmental data. Nodes may communicate on different channels/frequencies based on systematic or pseudo-random changes.

45 Claims, 16 Drawing Sheets

(56) References Cited

U.S. PATENT DOCUMENTS

| | | | |
|---|---|---|---|
| 2007/0247292 A1* | 10/2007 | Joung | H04B 7/2693 340/440 |
| 2019/0049912 A1* | 2/2019 | Poornachandran | G05B 19/0421 |
| 2020/0072814 A1* | 3/2020 | Bailey | G01M 5/0025 |

* cited by examiner

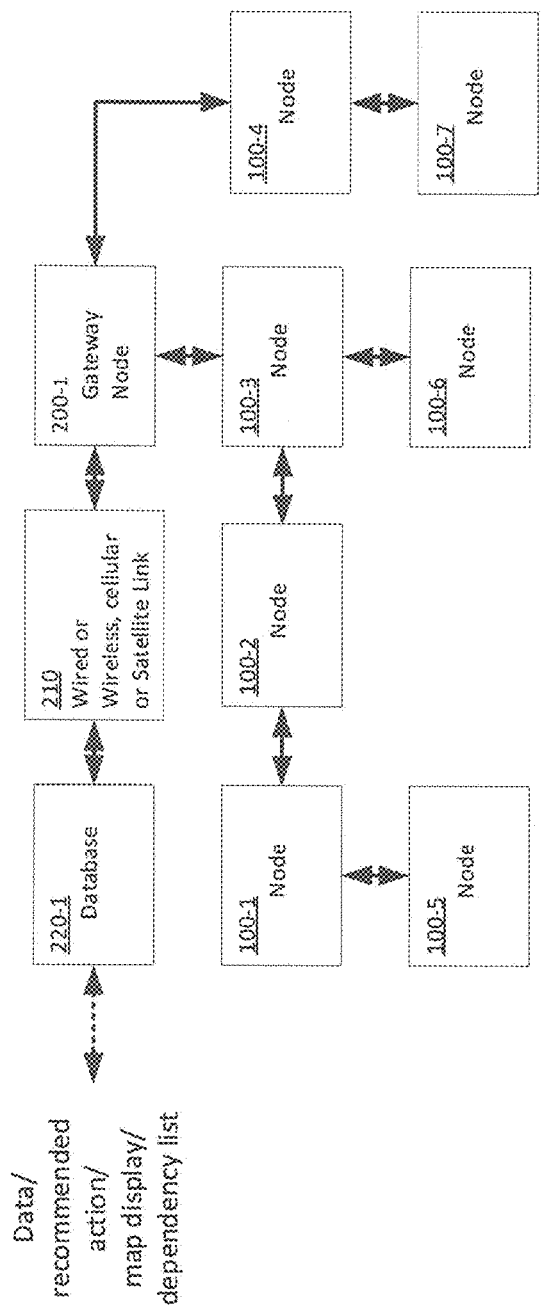

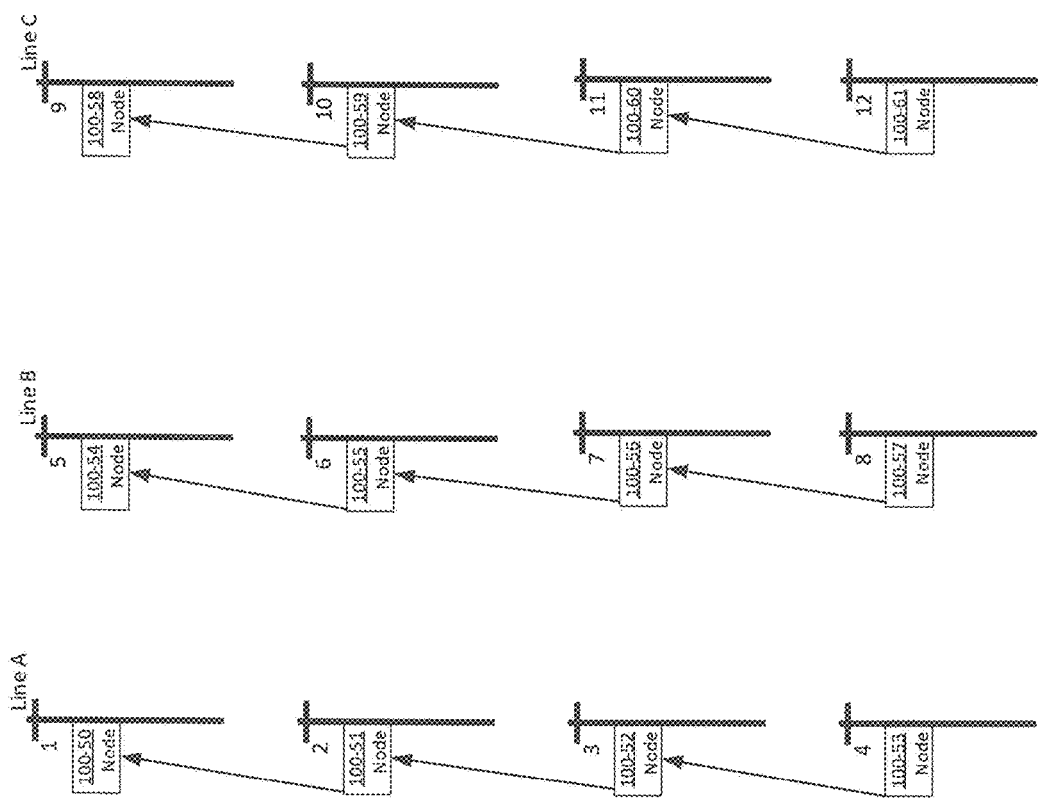

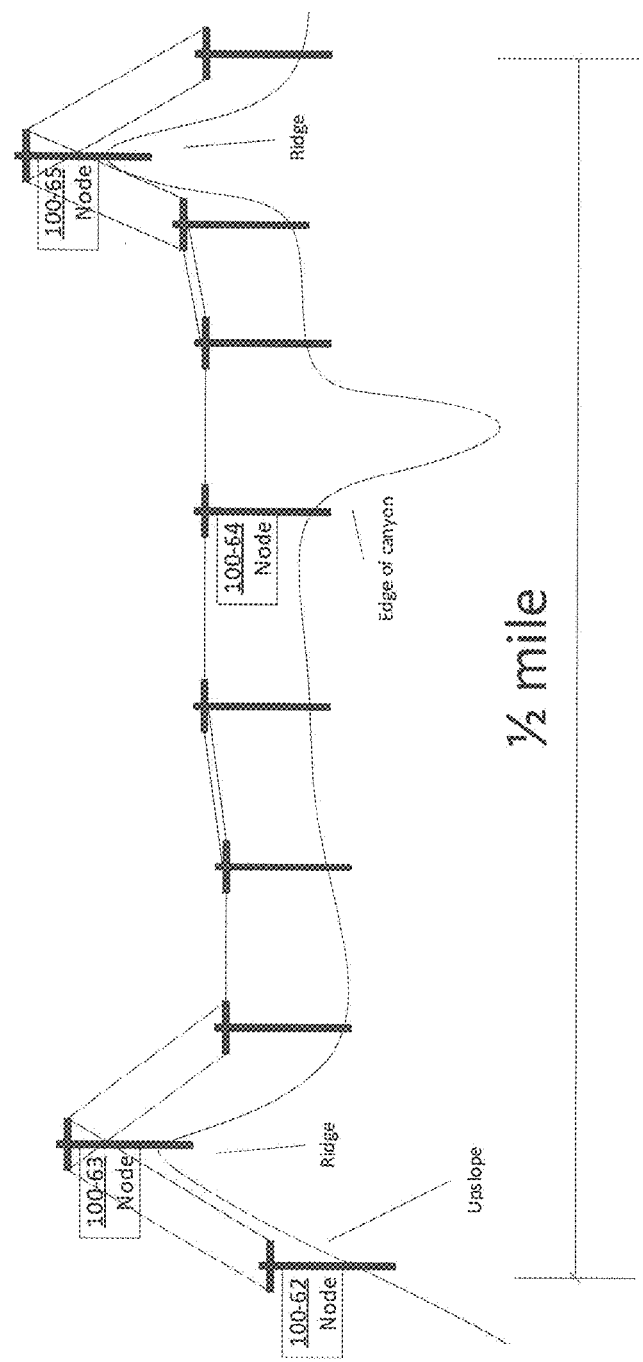

WIRELESS REMOTE MONITORING SYSTEM AND DATA COLLECTION AND CONTROL AND METHOD OF USING THE SAME

CROSS-REFERENCE

This application is a continuation-in-part application and claims priority to U.S. patent application Ser. No. 16/442,249 filed Jun. 14, 2019 which is incorporated herein by reference for all purposes.

FIELD OF THE INVENTION

The embodiments of the present invention relate to a wireless monitoring and control system incorporating nodes with configurable sensors that may be wirelessly connected to a gateway node. The embodiments of the present invention relate generally to the materials and methods involved in the process of collecting environmental data and in particular, the materials and methods involved in the use of sensors to measure weather conditions, impact, movement, and other potential damage events as related to utility poles and transmission towers.

BACKGROUND

Conventional wireless weather monitoring systems are unidirectional. They collect data and relay it to an assigned reception point, generally a base station unit that acts as a gateway. They require the use of base stations that collect data from one or more sensors on a one-to-one basis. For example: a base station may collect data from a sensor at one location and data from another sensor at a different location. If either sensor is out of range of the base station, that sensor's data will not be reported, even if it is within range of another sensor. This static 1-to-1 relationship between sensors and base stations limits the distance over which information may be collected from the base station without the installation of additional expensive base stations.

Remote Automated Weather Stations (RAWS) are bulky and expensive, often costing tens of thousands of dollars. RAWS use satellite uplinks and do not provide real time data, linking up to the satellite as little as once per hour. RAWS are very expensive to purchase and install so there are only a few thousand RAWS in the entire USA. The limited number of RAWS prohibits the collection of data on individual mountains, ridges or valleys because they are sporadically spaced tens to hundreds of miles apart. This spacing leaves large areas with unmonitored environmental conditions that can adversely affect infrastructure such as power lines. Additional weather-related information comes from other sources such as Automated Surface Observing Systems (ASOS) and Automated Weather Observing Systems (AWOS). These additional sources of data still leave miles between collection sites. Their placement is undertaken with little regard to the paths of utility lines and subsequently fail to measure actual weather conditions and their effects on utility lines.

Variances in weather, storm intensity, humidity and wind speed vary greatly at distances of less than one mile. Mountains, ridges and valleys can intensify weather variances by channeling weather in various directions. This channeling can intensify the severity of a wind gust or direct the weather in a different direction. Without a weather monitoring node in close proximity to these terrain changes, there is no measurement of the intensity of the wind or its effects on infrastructure in these specific areas.

In the power industry, utilities must make decisions on when to turn power off based on weather predictions and estimated wind speeds along the mountains, ridges and valleys between the weather monitoring stations. Further, utilities lack the ability to react quickly if the predictions are wrong, which can result in the utility being responsible for starting a wildfire.

When utilities are required to shut of power to avoid possible wildfires, the utilities have limited disconnection points resulting in affected areas much larger than necessary, inconveniencing customers and unnecessarily reducing revenue. People have become so reliant on utility power that outages can become life threatening for those relying on heating, cooling and/or medical equipment powered by the utility.

Thus, it would be advantageous to develop an affordable wireless weather monitoring system utilizing improved reporting intervals, sensors with enough density to determine changes in environmental conditions on a micro level vs. macro level and with the ability to send and receive commands to control other nodes.

SUMMARY

Embodiments of the present invention are directed to methods and apparatus utilizing a wireless environmental monitoring system, comprised of wireless nodes with integrated sensors configured to collect data related environmental factors. For example, each node in the system collects data from its sensors and routes the collected data, along with any data received from other nodes, to a central database via a gateway node, satellite link and/or cellular link.

A gateway node may contain some form of wireless or wired connection linking the gateway node to a centralized database. This database may store and tabulate the data collected from each node including gateway node and render the data available for review and/or may create an alert and recommended action.

The database can forward automatic commands back to a node reporting a specific condition or comprise of the interface for manual commands to be sent to individual nodes or all nodes, such as triggering a relay to activate a switch that shuts down power on a specific powerline. Collectively, the nodes, gateway nodes and database broadly comprise the system detailed herein.

The embodiments of the present invention provide unique methods of communication ability to monitor environmental conditions and their effects on structures, such as utility poles. Each node may communicate with other nodes and/or a gateway node within radio signal, consistent with a tree topology, to re-route data transmissions, balance traffic, node counts and signal strengths on a network level. Nodes can switch network legs or entire networks, as necessary, to maintain communication with the database through a gateway node, satellite link and/or cellular link without compromising the reporting of data as it relates to the structure or the utility support structure to which it is connected or the utility line to which it is associated.

Further, each node may be equipped with a solar panel or wind generator and battery allowing the node to operate without the requirement of a utility connection. The compact design and efficiencies incorporated into each device allow for simple, rapid deployment. The intelligent wireless communication methods support sporadic placement of nodes to locations where topology changes can have adverse effects on power lines and vegetation approximate to those lines that are not captured by traditional weather monitoring systems. Designed to be affordable, nodes can be placed strategically on all types of structures, including utility poles, buildings, towers and trees to provide a means of capturing the weather events occurring proximate those locations. For example, nodes placed at densities of less than ½ mile apart and at topological changes are considered to be sufficiently dense to capture the true weather impacts along segments of utility lines and provide the data necessary to make determinations related to when to turn the power off on those individual lines or segments of lines. In some cases, nodes may be placed on every utility pole or every other utility pole dependent upon, for example, the historical risk level determined by the prior sensor data collected for that segment of utility line. Only at this granularity and spatial separation can the true weather impacts be measured. Knowledge of the actual weather impacts on a structure, such as a utility pole, provide the operator with information the operator can use to focus efforts on where to clear additional vegetation, shut off power and/or inspect for damage.

In one embodiment, nodes which may include a gateway node communicate on a channel/frequency for a predetermined amount of time before performing a coordinated channel/frequency hop to another channel/frequency. In another embodiment, nodes including a gateway node communicate on a channel/frequency for a predetermined amount of time before performing a coordinated channel/frequency hop to another channel/frequency based on a pseudo-randomly generated seed transmitted to two or more or all devices in the dependency chain Other variations, embodiments and features of the present invention will become evident from the following detailed description, drawings and claims.

BRIEF DESCRIPTION OF THE DRAWINGS

FIG. 3A illustrates a diagram of the method of collecting sensor data via nodes from a plurality of locations according to embodiments of the present invention;

FIG. 7B illustrates representations of nodes in a graphical user interface according to embodiments of the present invention; and FIG. 8 illustrates node placement to address terrain changes, placement of nodes on utility poles and placement of nodes at density to accurately determine when to interrupt utility delivery according to embodiments of the present invention.

DETAILED DESCRIPTION

Figure 1A:
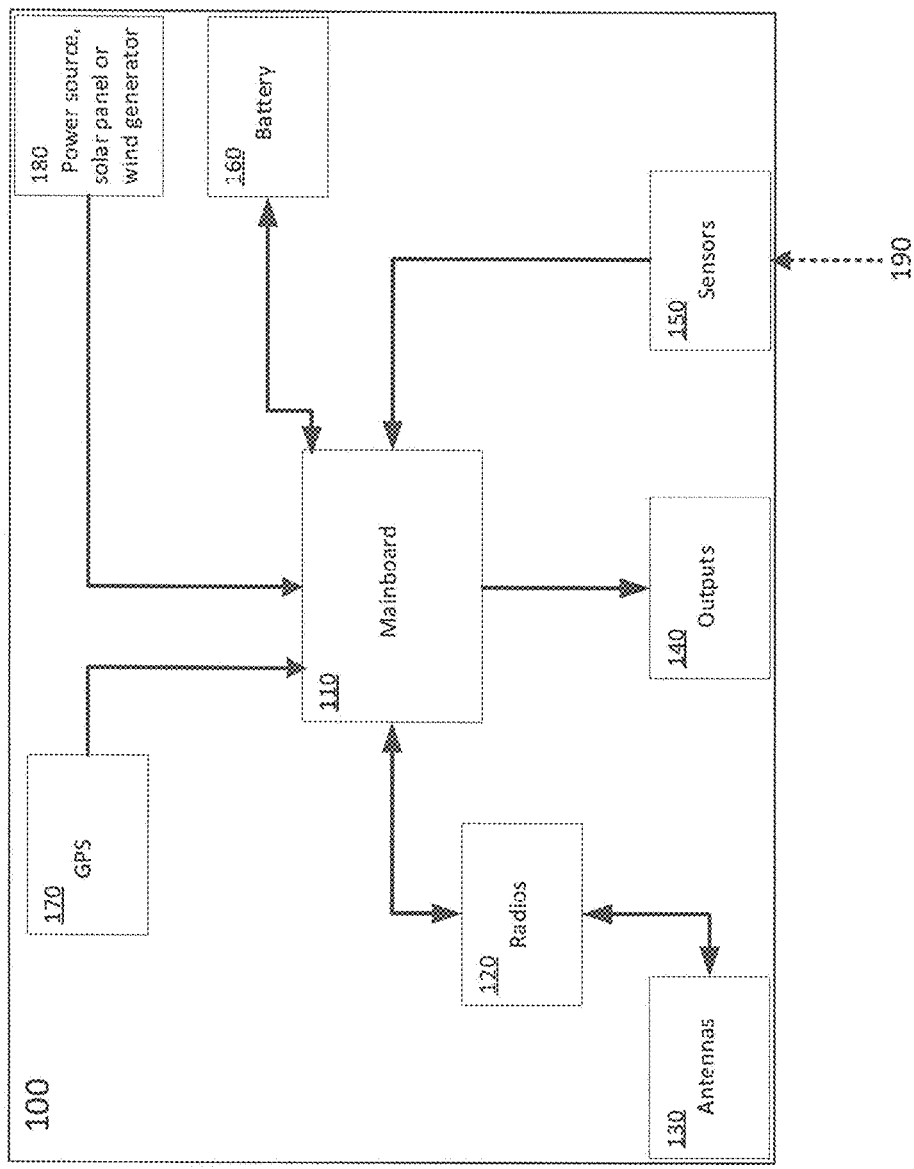
FIG. 1A illustrates a block diagram of a node with input sensors, wireless interfaces, charging/power system and outputs according to embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate the system and method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device. Cloud storage may be used as well.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS, Python, GO or similar programming languages. The programming code may be configured in an application, an operating system, as part of a system firmware, or any suitable combination thereof. The programming code may execute entirely on the user's computer, partly on the user's computer, as a standalone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "terminal" should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

Applicant herein incorporates by reference for any and all purposes U.S. Pat. No. 6,831,921 entitled "Wireless Internet Access System," U.S. Pat. No. 9,838,065 entitled "Methods and Systems for High Capacity Wireless Broadband Delivery" and U.S. Patent Application No. 62/607,871 entitled "Wireless Internet Access System and Method of Using the Same."

As depicted in FIG. 1A, a node 100 of the wireless remote monitoring system of the embodiments of the present invention generally comprises a main board 110 configured to receive data 190 collected from sensors 150. The sensor data relates to the measurement or quantification of a variable 190 affecting a utility pole and/or transmission tower or the wires attached thereto. The variables affecting a utility pole, transmission tower and/or wires attached thereto may be related to weather or natural disasters (e.g., wind exposure, wind-induced movement, lightning, etc.), or may be man-made variables (e.g., unauthorized tampering, vandalism, vehicle impact, etc.).

In one embodiment, the mainboard 110 uses microprocessor STM32L476RG manufactured by STMicroelectronics. In another embodiment, the mainboard 110 may incorporate a RFM69HCW radio manufactured by Adafruit. Additionally, radio 120 may consist of the same. In another embodiment, the mainboard 110 may use a Macronix flash chip MX25U6435F.

Additionally, still referring to FIG. 1A, nodes 100 may be configurable to accept different types of sensors 150. The sensors 150 may be affixed, wired or wirelessly connected to the node 100 and may be connected to the main board 110. Some examples of environmental data that may be collected include wind speed, wind direction, humidity, barometric pressure, rain fall and temperature. Additionally, examples of other types of sensors 150 that may be incorporated are cameras, motion, vibration, shock, battery voltage, solar voltage, charging voltage, charging amperage, diagnostic checks, fire detection, smoke detection, pressure, location, electromagnetic fields, voltage of powerlines, pipeline flows and other utility specific measurements.

In another embodiment, each node 100 is configurable to incorporate different types of outputs 140. These outputs 140 may send signals to connected devices to close or open relays or deliver information through a serial interface. Relays may trigger a switch or other apparatus that shuts down power on a specific powerline when high winds and/or other conditions occur. Such commands may come from the direct input of a user through the database 220 or be generated from a database 220 as configured by predetermined limits or events.

In another embodiment, nodes 100 in the weather monitoring system comprise one or more mainboards 110 with many types of chips, amplifiers, connection points, ports, and other common parts and pieces well known to those skilled in the art.

In another embodiment, nodes 100 are built with intelligence such as a hardware and/or software watchdog that is capable of resetting the node 100 or gateway node 200 in the event a process fails and the device stops responding or a node 100 is no longer able to communicate with another node 100, a gateway node 200, a satellite link 215, and/or a cellular link 216.

In another embodiment, the mainboard 110 acts as a charge controller that reports battery voltage, battery temperature and level of charge being delivered by the power source 180, such as a solar panel or wind generator. Further, the mainboard 110 acting in the capacity of a charge controller may start shutting down sensors 150 more frequently to conserve more power and/or enter a sleep mode until such time that sufficient power is available to operate normally.

Figure 1B:
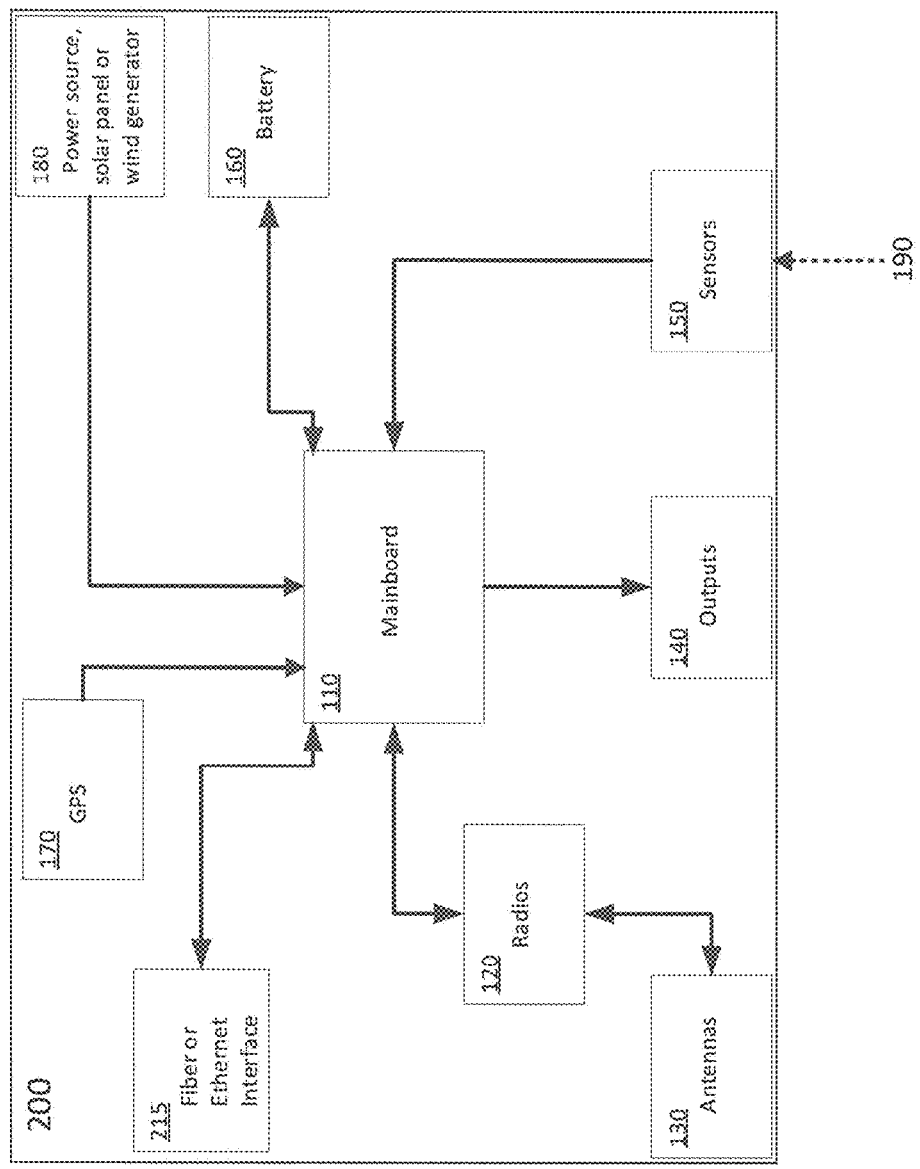
FIG. 1B illustrates a block diagram of a gateway node with input sensors, wireless interfaces, Ethernet and fiber interfaces, charging/power system and outputs according to embodiments of the present invention.

In another embodiment, as shown in FIG. 1B, nodes 100 of the wireless weather monitoring system are equipped with a Global Positioning System (GPS) receiver 170 configured to determine location data such as latitude, longitude and altitude. Said GPS receiver 170 may also have the capability to receive Pulse Per Second (PPS) information from orbiting satellites that may be used to synchronize radio transmission and reception within the system. This may allow all radios 120 within a node 100 or gateway node 200 to operate in half-duplex mode, transmitting simultaneously and then receiving simultaneously. This method of transmission may prevent node 100 to node 100 interference that can occur if transmissions are not synchronized via GPS and/or PPS. In another embodiment, a compass chip may be added to nodes 100 and gateway nodes 200 to determine precise azimuth orientation.

In another embodiment, the enclosure of each node 100 and gateway node 200 be rated with an Ingress Protection Marking (or IP rating). Gore vents or other form of water proof membrane may also be installed on a node 100 or gateway node 200 enclosure to prevent heat, pressure and condensation buildup inside the enclosure.

In another embodiment, inclusive of all of the options of FIG. 1A, a node 100 is configured as a gateway node 200 with Ethernet or fiber inputs for connections to fiber, satellite or other backhaul 210, as shown in FIG. 1B in addition to configurable sensors 150 and outputs 140. Gateway nodes 200 may have an Internet connection through a satellite, licensed or unlicensed wireless or cabled connection 210. For reference, unlicensed or lightly licensed wireless frequencies most commonly used today include: UHF/VHF (White Space), 900 MHz, ISM 900 MHz, 2.4 GHz, 3.65 GHz, 5 GHz, 24 GHz and 60 GHz. Licensed wireless frequencies most commonly used today include: 6 GHz, 7 GHz, 11 GHz, 13 GHz, 18 GHz, 23 GHz and 80 GHz. Optical wireless technologies such as lasers may also be used. Cabled technologies such as fiber, ethernet, coaxial cable or DSL may also be used.

Figure 2A:
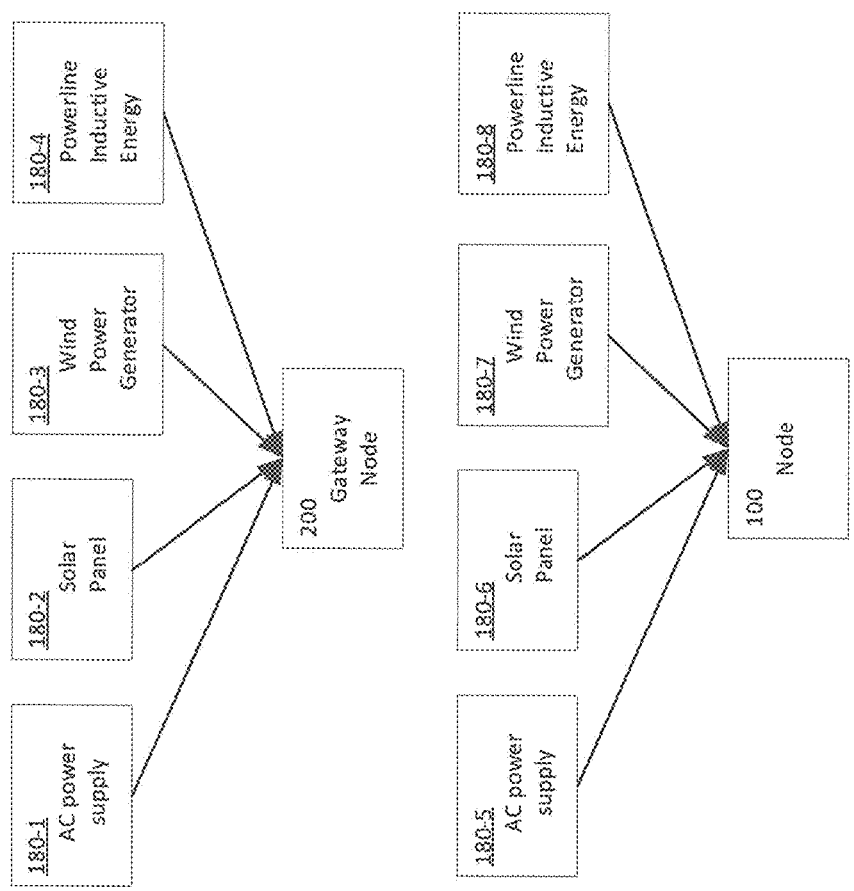
FIG. 2A illustrates different power sources as a method of powering a node or gateway node according to embodiments of the present invention.
Figure 2B:
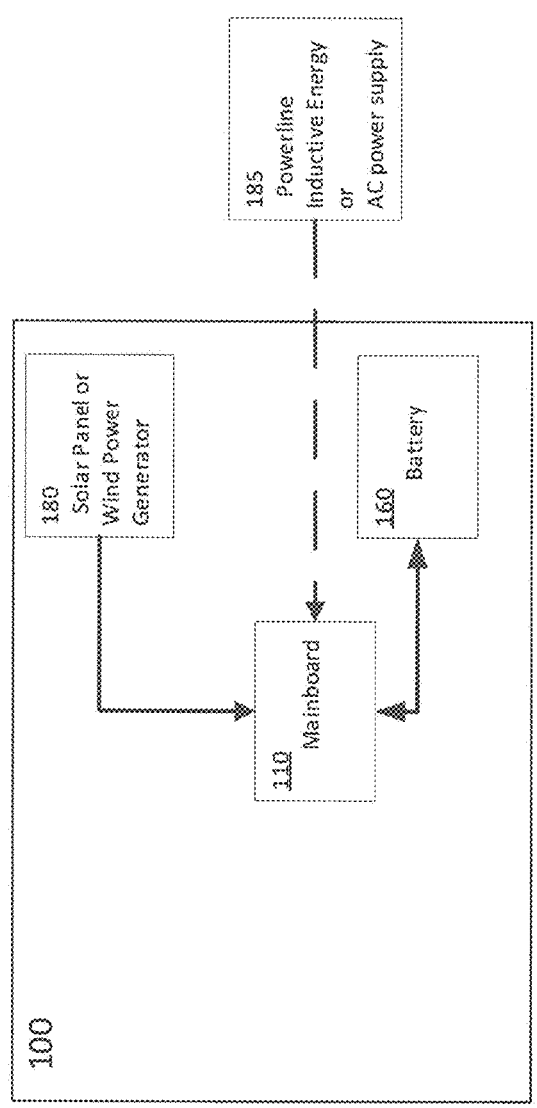
FIG. 2B illustrates an alternative power draw according to embodiments of the present invention.

In another embodiment, a node 100 or gateway node 200 is self-contained and capable of powering itself through solar power 180 and internal battery 160 or receiving power from an external source 180, such as power from AC Power Supply 180-1, 180-5, solar panel 180-2, 180-6, wind power generator 180-3, 180-7 or utility line 180-4, 180-8 as shown in FIG. 2A. In another embodiment, a node 100 or gateway node 200 may only draw power from an external source 180 when the devices battery 160 voltage is below a designated threshold and/or no charge is detected from a primary energy source 180, such as a solar panel. FIG. 2B shows the optional external power connection 185.

In another embodiment, a node 100 may enter a suspended state to conserve energy. In the suspended state, the mainboard 110 may shut down power to the sensors 150 and radios 120, as well as put itself to sleep to conserve energy. An internal timer working on a pre-configured schedule, or an external input, such as a battery voltage above a predesignated level, may signal the mainboard 110 to re-energize itself, the sensors 150 and radios 120 for a duration long enough to collect the desired measurements 190 and send the information to the next node 100. This may be particularly useful in winter months when solar power may be minimal.

Figure 3B:
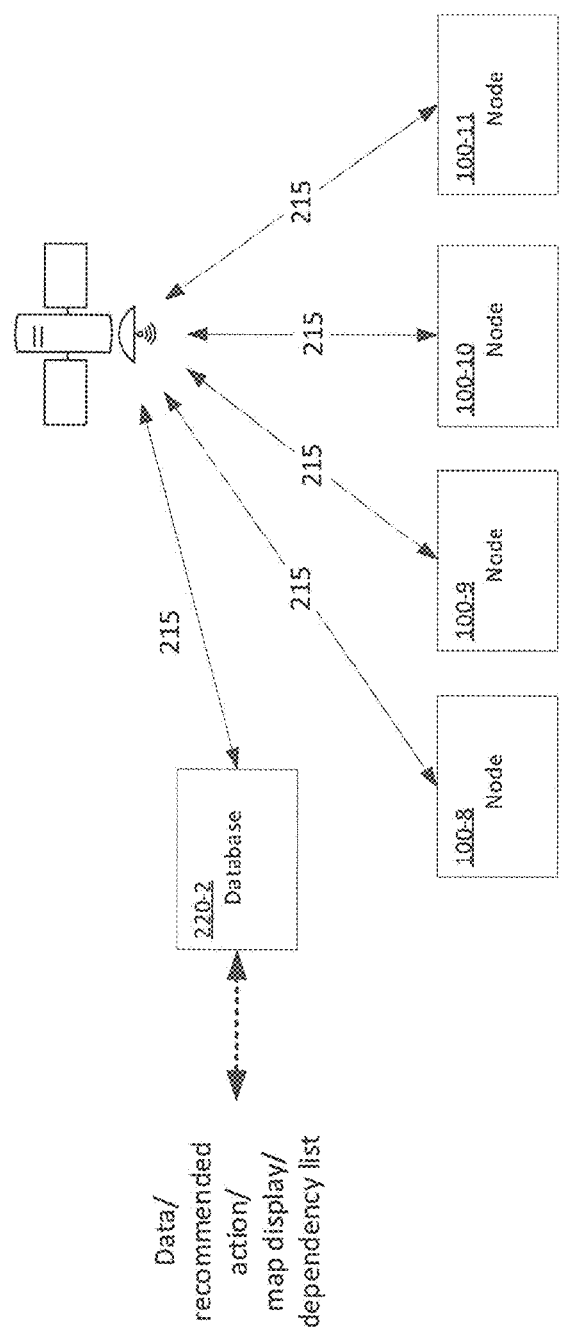
FIG. 3B illustrates nodes connecting to satellites instead of gateway nodes to communicate directly with the database according to embodiments of the present invention.
Figure 3C:
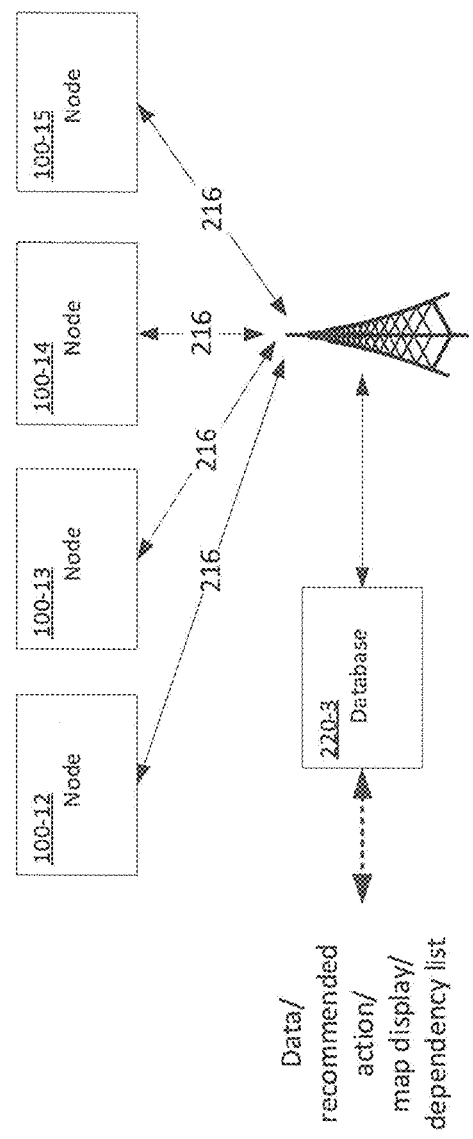
FIG. 3C illustrates nodes connecting to a cellular network instead of gateway nodes to communicate directly with the database according to embodiments of the present invention.

In another embodiment, a gateway node 200-1 and each node 100-1 through 100-7 within its dependency chain, keep track of the nodes 100 that report through it, as shown in FIG. 3A. If a command is sent through the central database 220-1 or other interface, via link 210, a gateway node 200 may forward the command to the correct node 100 for execution. In another embodiment, nodes 100-8 through 180-11 may communicate with the central database 220-2 through a satellite link 215 as shown in FIG. 3B or nodes 100-12 through 100-15 may communicate with the central database 220-3 through cellular link 216 as shown in FIG. 3C instead of connecting to the database 220-1 through other nodes 100-1 through 100-7 and/or gateway node 200-1 as shown in FIG. 3A.

Figure 4A:
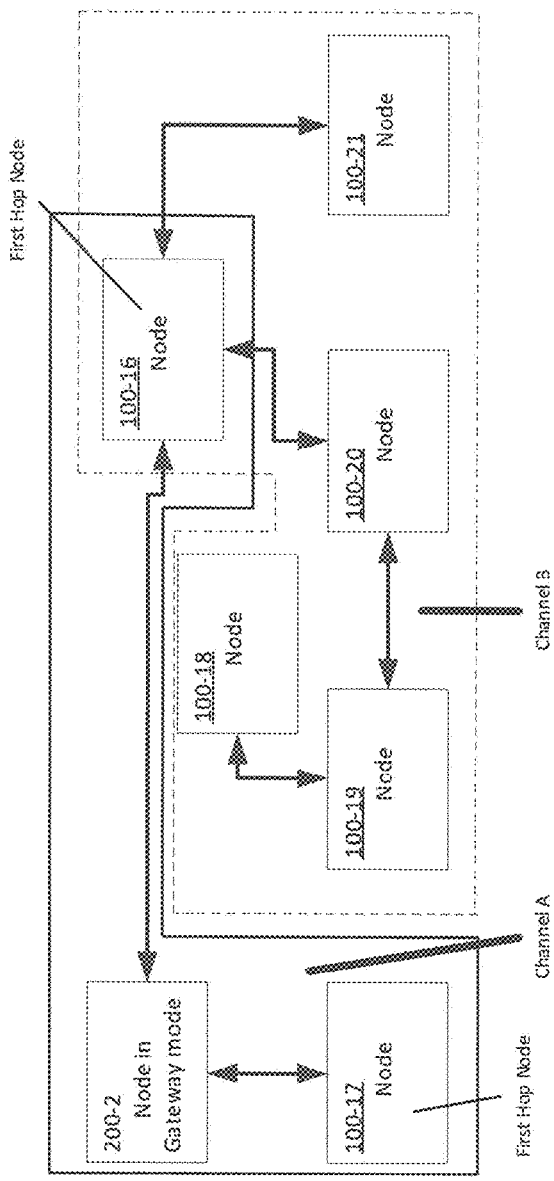
FIG. 4A illustrates the wireless topology of the system and the optional channeling configuration according to embodiments of the present invention.

In another embodiment, a gateway node 200-2 and each of its directly connected nodes 100-16, 100-17, (the first hop), operate on a different frequency than any subsequent layer of nodes 100-18 through 100-21 within its dependency chain. See reference to channel A in FIG. 4A. Additionally, nodes 100 and gateway nodes 200 may alternate frequencies based on the device they are communicating with to better manage channel congestion. The use of multiple frequencies of communication is represented by reference to channel A and channel B in FIG. 4A.

Figure 4B:
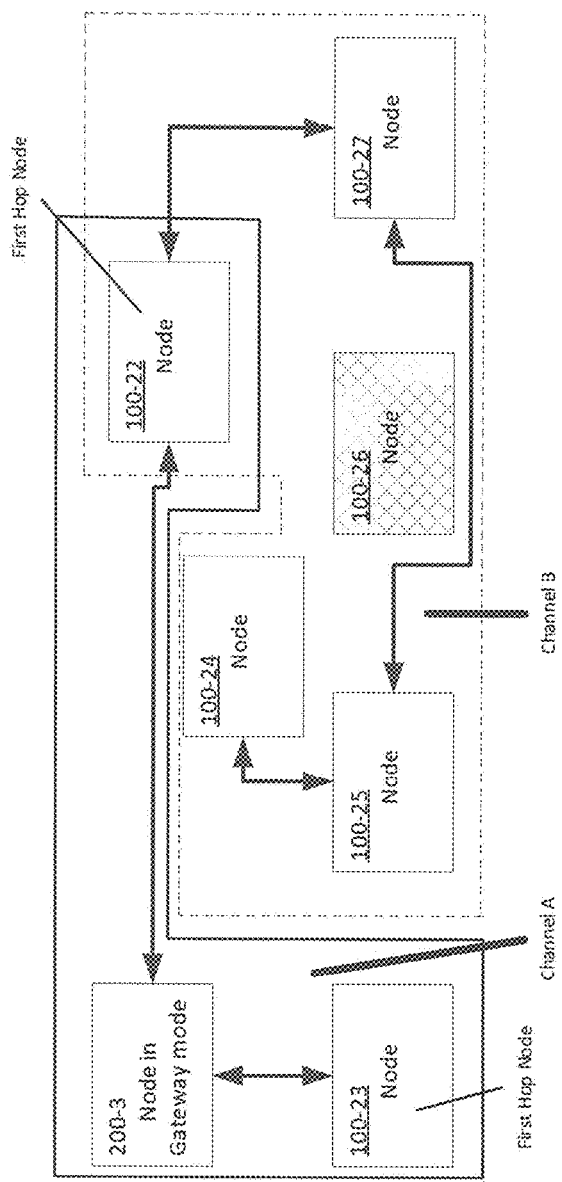
FIG. 4B illustrates re-routing of the system shown in FIG. 4A in the event of a signal issue between nodes or the failure of a node according to embodiments of the present invention.
Figure 6:
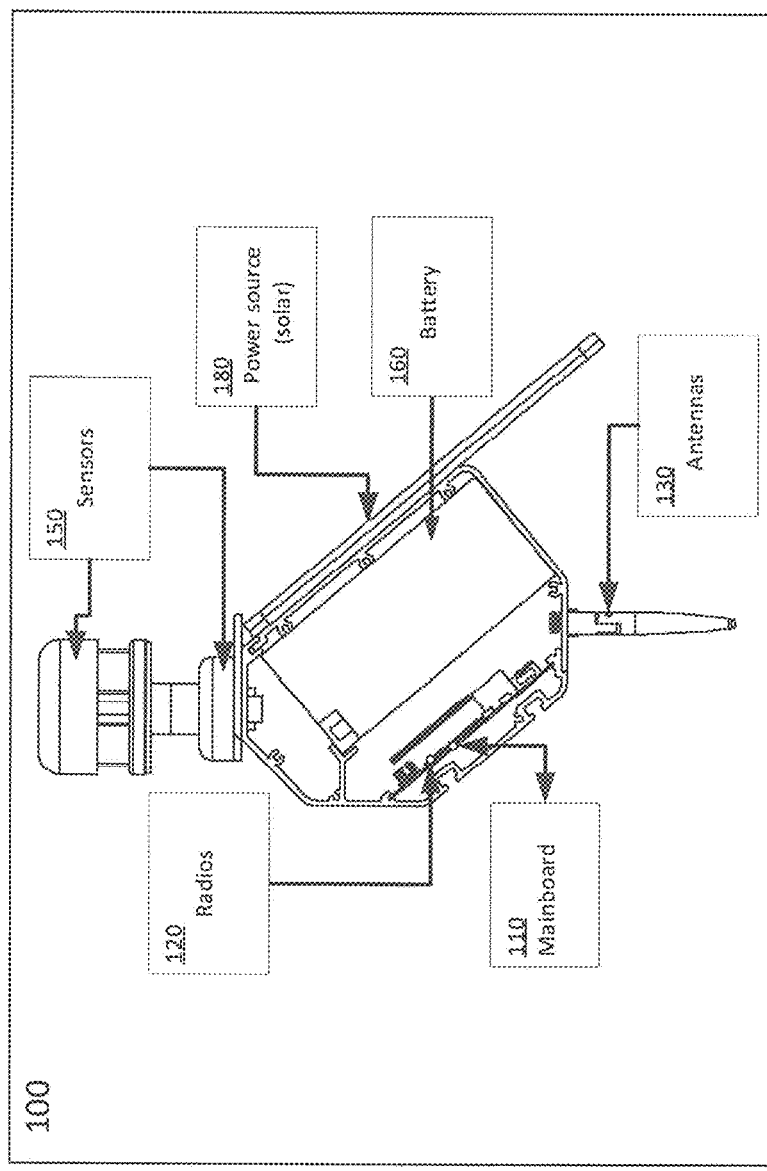
FIG. 6 illustrates a transparent view of a node showing a component arrangement and shielding of the radios within the node's metallic enclosure according to embodiments of the present invention.

In another embodiment, nodes 100 have one or more integrated or attached radios 120 connected to one or more directional, sectorized or omni-directional antennas 130 (as seen in FIG. 6) for connecting to other nodes 100 or gateway nodes 200 and are capable of wirelessly re-routing around a node 100 that is offline or performing poorly. The re-routing is shown in FIG. 4B showing gateway node 200-3 and nodes 100-22 through 100-27 with node 100-25 bypassing the offline or poorly performing node 100-26 and communicating directly with node 100-27. This feature may prevent a single node 100 failure from stranding other nodes 100 downstream. In a configuration utilizing more than one radio 120, the additional radio(s) 120 may perform scanning and probing functions while the primary radio 120 maintains its connection to other nodes 100.

Additionally, nodes 100 may utilize radios 120 configured for transmitting and receiving wireless signals on licensed, lightly licensed, unlicensed, cellular and/or satellite radio frequency bands. A few examples of unlicensed bands include ISM or UNII-1, UNII-2, UNII-3 and CBRS bands. These unique frequency bands may have different EIRP, antenna gain, transmit power and various other requirements and/or restrictions (through various regulatory bodies such as the FCC). The embodiments of the present invention are configurable to work within any of the frequency bands that are unlicensed, lightly licensed or licensed wireless frequencies commonly used today, including: UHF/VHF, White Space, satellite, 4G, 5G, LTE, 900 MHz, ISM 900 MHz, 2.4 GHz, 3.65 GHz, 5 GHz, 24 GHz, 60 GHz, 6 GHz, 7 GHz, 11 GHz, 13 GHz, 18 GHz, 23 GHz and 80 GHz.

Additionally, radios 120 may beacon and/or perform scans to evaluate interference on each individual channel level and determine which nodes 100 and/or gateway nodes 200 having a connection to the database 220 are within radio range of the node 100 performing the survey. Based on existing radio traffic and/or beacons and signal quality level of that potential or actual connection, the node 100 performing the survey weighs and values each potential or actual connection. This survey information may be saved for use for initial association to parent nodes 100 or gateway nodes 200 having a connection to the database 220 and/or connecting to other nodes 100 when a parent node 100, gateway node 200 having a connection to the database 220, satellite link 215, or cellular link 216 is or becomes unavailable or if interference becomes present on a channel or frequency currently in use.

In another embodiment, the system, comprising nodes 100, gateway nodes 200, a central database 220, wireless links (including satellite links 215 and cellular links 216) may use a shared encryption key as a method of authentication system-wide and/or on a per network and/or per connection basis, such as a node-to-node or node-to-gateway node link.

Figure 5:
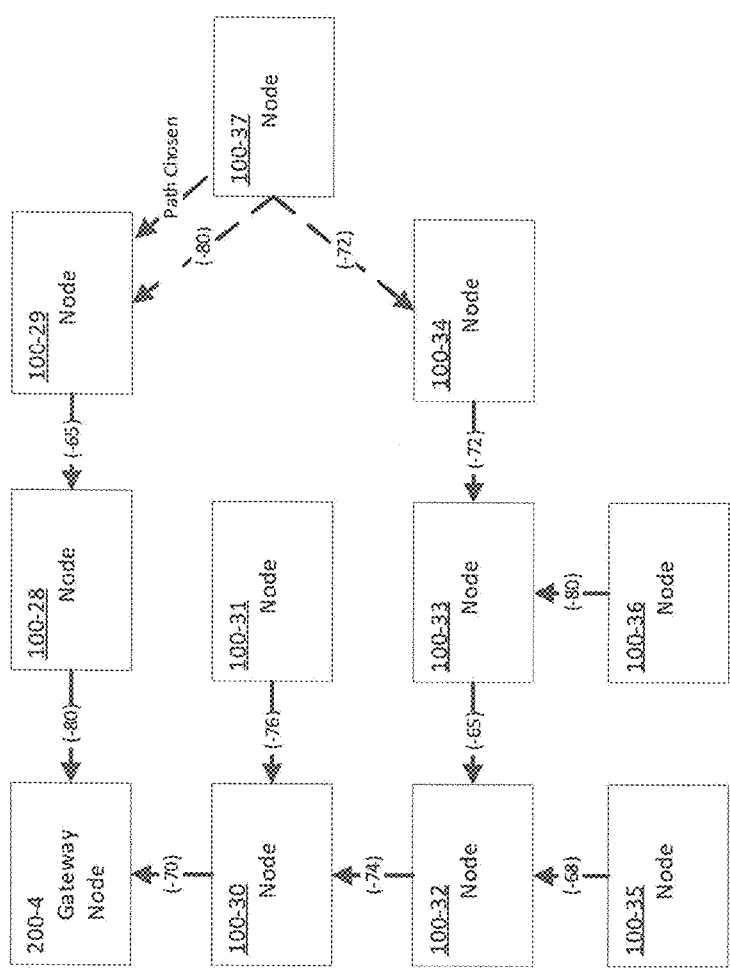
FIG. 5 illustrates an exemplary network routing selection based on node count and signal strengths between devices of the system according to embodiments of the present invention.

In another embodiment, the next step of association may include listening for communications between nodes 100 and other nodes 100 and/or nodes 100 and gateway nodes 200. Each transmission in a communication may include a channel and/or frequency identifier, in addition to other data, that the listening node 100 uses in determining which device to associate to. In the absence of communication transmissions, nodes 100 may probe nodes 100 and/or gateway nodes 200 on each channel for association and/or data on the number of hops to a gateway node 200 with a connection to the database 220, the number of nodes 100 supported by that upstream node 100, the total number of nodes 100 connecting to or through a gateway node 200 supporting them and the Received Signal Strength Indicator (RSSI) of each node-to-node and node-to-gateway node connection along each possible path. Nodes 100 that are connected to a gateway node 200 and supporting other nodes 100 (first hop) that are probed or while communicating on channel A with the gateway node 200 may respond with information to the requesting node 100 on channel A but may indicate that node-to-node communication and association requests are occurring on channel B. The node 100 that is seeking an association may listen for this information while it is being transmitted and may use it to create an association to the first hop node 100 on channel B. See reference to channel A and channel B in FIG. 4A. In the event a node 100 does not have a connection to a gateway node 200 with a connection to the database 220, the data requests may not be responded to, forcing the node 100 attempting to create an association to find a new path to the gateway node 200 with a connection to the database 220 or a path to a different gateway node 200 with a connection to the database 220. This method of evaluating signal levels between nodes 100, nodes 100 connecting to or through individual nodes 100 and the nodes 100 connecting to or through gateway nodes 200 balances connections on a network level. An example of this method of multi-level selection is shown in the node configuration of FIG. 5. The system of FIG. 5 includes a gateway node 200-4 and nodes 100-28 through 100-37. As shown, node 100-37 has the option of communicating with node 100-29 or node 100-34. Although the signal strength to Node 100-34 is stronger −72 vs −80 to node 100-29, node 100-37 communicates through node 100-29 not only because the path to gateway node 200-4 has less hops but also because the system has factored in node 100 counts on individual paths, the number of nodes 100 being supported by other nodes 100 along each path, channel/frequency interference, signal strengths and other factors that affect node 100 to node 100 and node 100 to gateway node 200 communication.

Figure 4C:
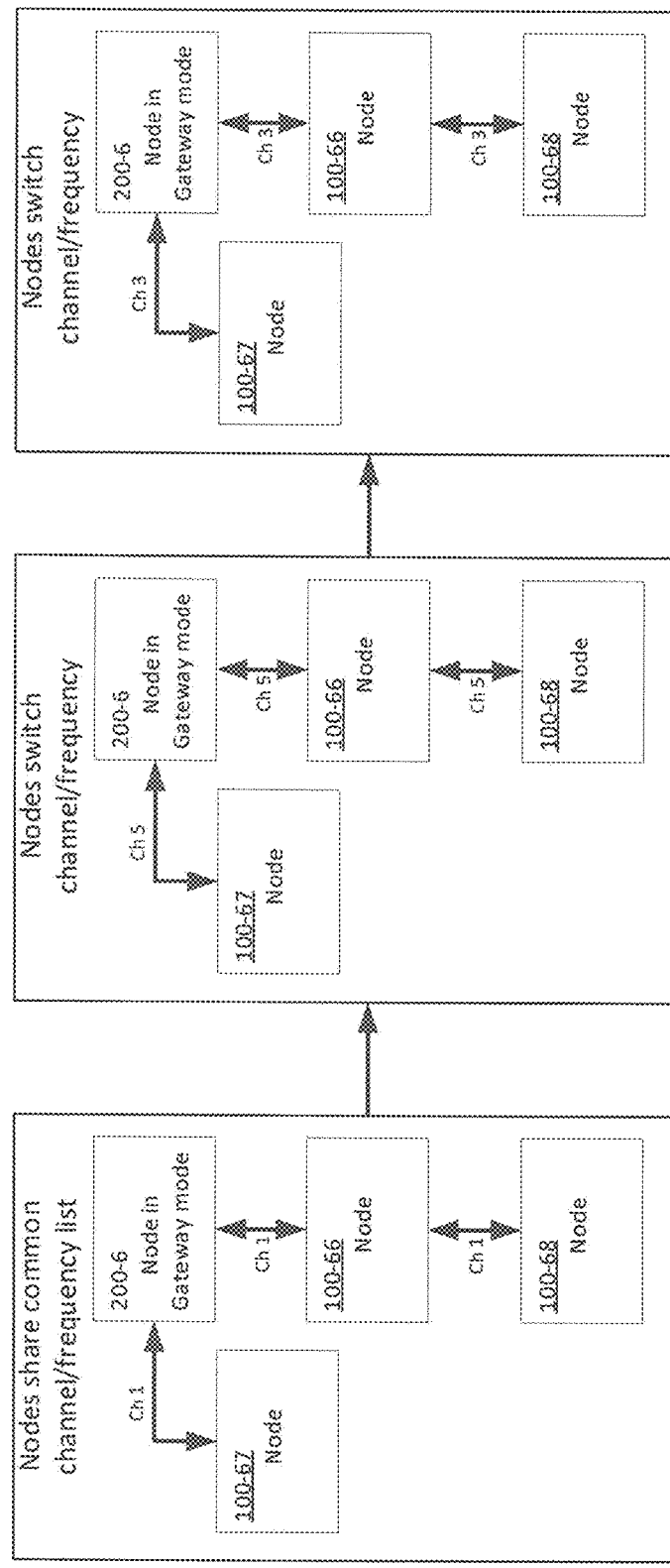
FIG. 4C illustrates the use of channel/frequency changing coordination amongst devices through the use of a fixed channel/frequency list with said channel/frequency changing managed by an internal clock.

In another embodiment, as shown in FIG. 4C, nodes 100-66 through 100-68 and gateway node 200-6 communicate on a channel/frequency for a predetermined amount of time before performing a coordinated channel/frequency hop to another channel/frequency. The channel/frequency hopping is based on the use of a fixed channel/frequency list that may be shared by two or more or all devices in a dependency chain. A system may incorporate the use of one fixed channel/frequency list between two or more devices and a separate fixed channel/frequency list between two or more other devices. Internal clocks may be used to coordinate the channel/frequency hopping of devices, including the possibility to delay transmissions if the transmission will exceed the time remaining before the next channel/frequency change. In one embodiment, for those devices operating at frequencies between 902 MHz and 928 MHz, and if the 20 dB bandwidth of the hopping channel/frequency (where the signal emissions are attenuated by 20 dB relative the power measured in the center of the carrier) is less than 250 kHz, the system may use 51 hopping channels/frequencies or more and not occupy any one channel/frequency for more than 400 milliseconds within a 20 second time period. Consequently, each channel/frequency is equally used, on average.

Figure 4D:
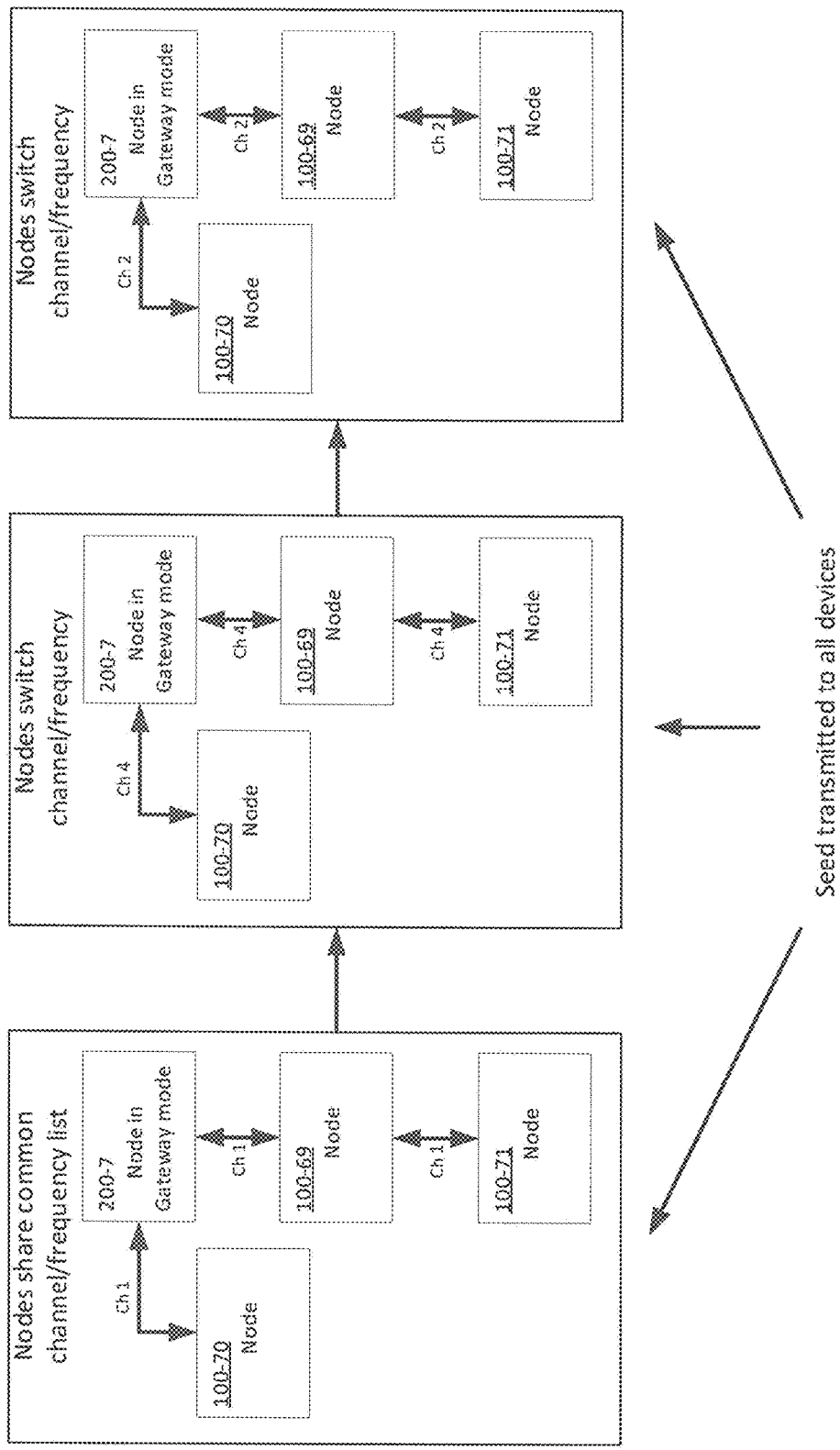
FIG. 4D illustrates the use of channel/frequency changing coordination amongst devices through the use of a pseudo-random seed containing channel/frequency information transmitted to each device.

In another embodiment, as shown in FIG. 4D, nodes 100-69 through 100-71 and gateway node 200-7 communicate on a channel/frequency for a predetermined amount of time before performing a coordinated channel/frequency hop to another channel/frequency based on a pseudo-randomly generated seed transmitted to two or more or all devices in the dependency chain. The pseudo-randomly generated seed may contain channel/frequency and timing information. Said new channel/frequency and timing information may be predetermined or randomly assigned. A system may incorporate the use of one pseudo-randomly generated seed between two or more devices and a separate pseudo-randomly generated seed between two or more other devices. Internal clocks may be used to coordinate the channel/frequency hopping of devices, including the delay of transmissions if the transmission will exceed the time remaining before the next channel/frequency change. In one embodiment, for those devices operating at frequencies between 902 MHz and 928 MHz, and if the 20 dB bandwidth of the hopping channel/frequency (where the signal emissions are attenuated by 20 dB relative the power measured in the center of the carrier) is less than 250 kHz, the system may use 51 hopping channels/frequencies or more and not occupy any one channel/frequency for more than 400 milliseconds within a twenty second time period. Consequently, each channel/frequency is equally used, on average.

Additionally, nodes 100 may not respond to other nodes 100 if they lose their path to a gateway node 200 with a connection to the database 220 and/or if their gateway node 200 has stopped sending data requests. This lack of response may trigger nodes 100 to store their sensor data 190 and search for another path to a gateway node 200 having a connection to the database 220.

In another embodiment, a gateway node 200 requests sensor data 190 and other data from each of its directly connected nodes 100 individually or collectively on a predetermined schedule. This request for sensor data 190 and other data may be performed on a channel or frequency selected by a gateway node 200 that is unique and separate from the channel or frequency used by nodes 100 during node-to-node communications. Once this sensor data 190 and other data requests are responded to, the gateway node 200 may send a command to the nodes 100 directly connected to it to switch channels or frequencies and collect data from their child nodes. In turn, each node 100 may request sensor data 190 and other data from each of its directly connected nodes 100 until the requests reach the node 100 at the end of each dependency chain. After data collection is complete, nodes 100 may switch back to its associated gateway node 200 frequency and wait for the next communication. This same task may be completed without switching channels.

Additionally, this sensor data 190 request may be forwarded until it reaches the node(s) 100 at the end of the dependency chain. A node 100 at the end of the dependency chain, having no other nodes 100 connecting to or through it, may, as requested, forward the sensor data 190 and other data it has up through the dependency chain, with each node 100 in the dependency chain adding its sensor data 190 and other data to the collection of data being forwarded. A node 100 may store sensor data 190 and other data from its downstream dependencies until all dependent nodes 100 have reported, then transmit this collection of sensor data 190 and other data, upstream to its parent node 100 or gateway node 200. The gateway node 200 may also store this collection of sensor data 190 and other data until all dependent nodes 100 have reported before sending the collection of sensor data 190 and other data to the central database 220. This method of data collection may incorporate RF transmission and reception timing methods allowing only one node 100 in a dependency chain to transmit at any given time to reduce wireless packet transmission collisions and retries. Alternatively, a gateway node 200 may poll nodes 100 directly connected or in its dependency chain(s) for sensor data 190 and other data directly at one time or individually. When a node 100 utilizes a satellite link 215 or cellular link 216 the database 220 manages the polling and polling intervals of the nodes 100 for sensor data 190 and other data.

Additionally, a node 100 and/or gateway node 200 may separate the sensor data 190 requests and other data requests. This other data may include, RSSI, node-to-node and node-to-gateway node 200 associations, frequencies or channels in use, etc.

In another embodiment, the system of nodes 100 and gateway nodes 200, when not utilizing a satellite link 215 or cellular link 216, may reconfigure themselves by sending data requests and/or commands to other nodes 100 prompting them to disassociate, suspend, or upgrade software. This reconfiguration may occur through multiple methods. Reassociation of a node 100 or multiple nodes 100 occurs when a node 100 does not receive a data request from a node 100 with which it is associated within a given amount of time.

The node 100 may assume it has become disassociated and may start a new survey or probe and associate with a different node 100 or gateway node 200. Reconfiguration may also occur when a gateway node 200 reaches a node 100 capacity limit the gateway node 200 is capable of supporting, thereby not allowing any new nodes 100 to associate with the gateway node 200 or any of the nodes 100 within its dependency chain. Alternatively, or additionally, gateway nodes 200 may change the timing of the data polling allowing more nodes to connect to it, through it and/or other nodes 100. Node 100 intelligence makes this architecture novel by allowing the entire network to dynamically reconfigure itself to: minimize interference, optimize throughput, circumvent node 100 outages, increase redundancy and reliability. Every time a new node 100 is installed, network coverage, distances between nodes 100 and data rates to nearby nodes 100 may improve and result in a reconfiguration of node 100 connections to better optimize the network.

In another embodiment, node 100 enclosures are designed to act as a shield for RF energy, minimizing or preventing RF energy from reaching the radios 120 except through the antennas 130. FIG. 6 shows a node 100 constructed of metal (shown as transparent) to allow the interior arrangement to be viewed. Direct solder, U.FL, BNC, SMA, RPSMA or N connectors may be used to make connections between radios 120, cables and antennas 130. Such system features reduce interference, improve noise floors and allow higher performance.

Figure 7A:
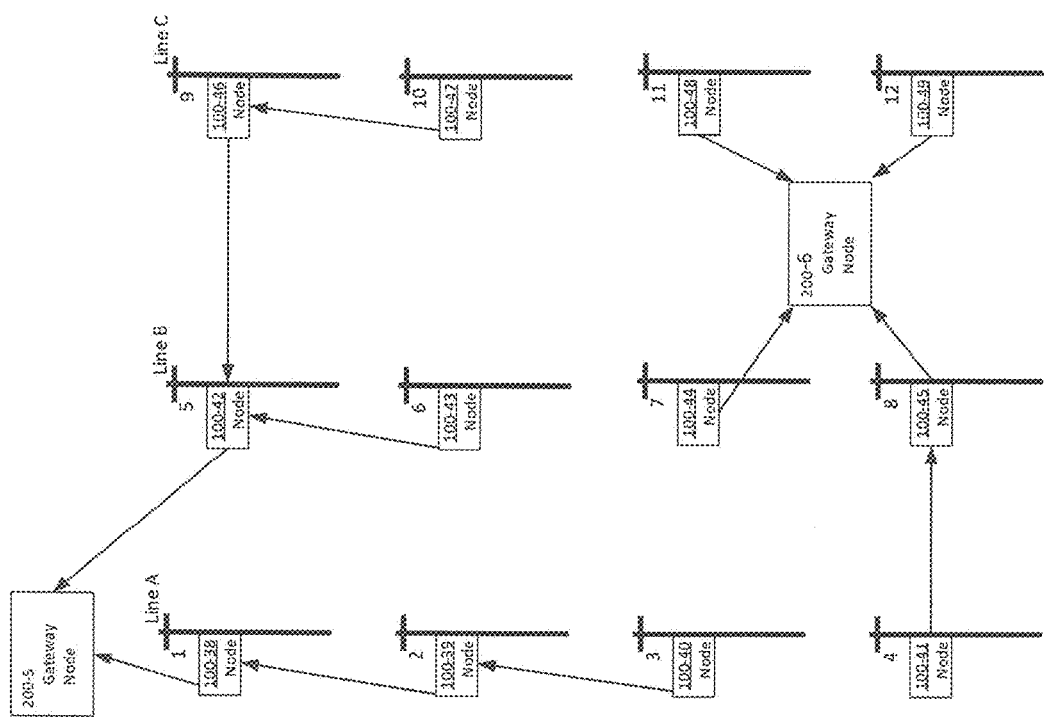
FIG. 7A illustrates node spacing and wireless connections on utility poles according to embodiments of the present invention.

In another embodiment, the database 220 keeps track of which nodes 100 are installed on utility line segments, as identified during installation & setup, then visually represent or group nodes 100 according to the utility line they are monitoring as shown in FIG. 7B, regardless of the gateway node 200 they are connected to, as shown in FIG. 7A. The visual representations shown in FIG. 7B also apply to nodes 100 utilizing a satellite link 215 or cellular link 216. Additionally, the database 220 may configure alerting or actions based on nodes 100 grouped or assigned to a specific utility line, or utility line segment or group of utility lines. More specifically, in FIG. 7B, utility line A comprises nodes 100-50 through 100-53 orientated in a manner representative of the line they are monitoring and not necessarily how they communicate; utility line B comprises nodes 100-54 through 100-57 orientated in a manner representative of the line they are monitoring and not necessarily how they communicate and utility line C comprises nodes 100-58 through 100-61 orientated in a manner representative of the line they are monitoring and not necessarily how they communicate. More specifically, in FIG. 7A, utility line A comprises nodes 100-38 through 100-41 with nodes 100-38 through 100-40 communicating through each other and node 100-38 communicating through gateway node 200-5; utility line B comprises nodes 100-42 through 100-45 with nodes 100-42 through 100-43 communicating through each other and node 100-42 communicating through gateway node 200-5 utility line C comprises nodes 100-46 through 100-49 with nodes 100-46 through 100-47 communicating through each other and node 100-46 communicating through node 100-42. Nodes 100-44, 100-45, 100-48 and 100-49 communicate through gateway node 200-6 while node 100-41 communicates through node 100-45.

In another embodiment, as shown in FIG. 8, nodes 100-62 through 100-65 are placed at densities of less than ½ mile apart and at topological changes to sufficiently capture the true weather impacts along segments of utility lines and provide the sensor data 190 necessary to make determinations relative to when to turn the power off. In extreme risk areas, nodes 100 may even be placed on every utility pole or every other utility pole, dependent upon the risk level determined by the prior sensor data collected for that segment of utility line.

Although the invention has been described in detail with reference to several embodiments, additional variation and modifications exist within the scope and spirit of the invention as described and defined in the following claims.

I claim:

1. A wireless remote monitoring system, comprising:
   a plurality of nodes including integrated sensors configured to collect data relative to environmental factors, each of said plurality of nodes configured to transmit and receive collected data from at least one other node from amongst said plurality of nodes;
   a central computer maintaining a database, said database for storing said collected data relative to environmental factors;
   a communication link between said plurality of nodes and said central computer, said communication link configured to transmit said collected data from said integrated sensors to said central computer for evaluation;
   wherein said central computer is configured to evaluate said collected data to determine environmental conditions proximate utility support structures such that selective electrical utilities may be shut down if said environmental conditions pose a risk to said utility support structure; and
   wherein said communication link utilizes frequency hopping via a fixed, pre-established set of channels or frequencies wherein any gateway node and subsequent layer of nodes within a common dependency chain communicate on the same channel or frequency within said pre-established set of channels or frequencies for a period of time before a change to a next channel or frequency within said pre-established number of channels or frequencies.

2. The wireless remote monitoring system of claim 1 wherein at least one node acts as a gateway node.

3. The wireless remote monitoring system of claim 1 further comprising one or more internal clocks configured to facilitate said change to a different channel or frequency within said pre-established number of channels or frequencies.

4. The wireless remote monitoring system of claim 1 wherein each of said plurality of nodes comprises at least an enclosure, power source, battery, controller, antenna and radio.

5. The wireless remote monitoring system of claim 1 wherein each of said plurality of nodes are equipped with a GPS receiver configured to determine location data such as latitude, longitude and altitude.

6. The wireless remote monitoring system of claim 1 wherein said communication link comprises a gateway node, satellite link and/or cellular link.

7. The wireless remote monitoring system of claim 1 wherein each of said plurality of nodes are positioned on utility poles, utility towers and/or trees.

8. The wireless remote monitoring system of claim 7 wherein a density of said plurality of nodes includes a node positioned no more than ½ mile from a neighboring node within a subject geographic region.

9. The wireless remote monitoring system of claim 4 wherein said power source is an AC power supply, one or more solar panels, wind power generator and/or powerline inductive energy.

10. The wireless remote monitoring system of claim 5 wherein said GPS receiver is configured to receive PPS information from orbiting satellites that may be used to synchronize radio transmission and reception.

11. A wireless remote monitoring system, comprising:
    a plurality of nodes including integrated sensors configured to collect data relative to environmental factors, each of said plurality of nodes configured to transmit and receive collected data from at least one other node from amongst said plurality of nodes;
    a central computer maintaining a database, said database for storing said collected data relative to environmental factors;
    said gateway node configured to communicate with said plurality of nodes and said central computer, said gateway node configured to transmit said collected data from said integrated sensors to said central computer for evaluation;
    wherein said central computer is configured to evaluate said collected data to determine environmental conditions proximate utility support structures such that selective electrical utilities may be shut down if said environmental conditions pose a risk to said utility support structure; and
    wherein said communication link utilizes frequency hopping via a pre-established set of channels or frequencies wherein any gateway node and subsequent layer of nodes within a common dependency chain communicate on the same channel or frequency within said pre-established set of channels or frequencies for a period of time before a pseudo-random change to another channel or frequency within said pre-established number of channels or frequencies.

12. The wireless remote monitoring system of claim 11 wherein at least one node acts as a gateway node.

13. The wireless remote monitoring system of claim 11 further comprising one or more internal clocks configured to facilitate said pseudo-random change to a different channel or frequency within said pre-established number of channels or frequencies.

14. The wireless remote monitoring system of claim 11 further comprising one or more pseudo-randomly generated seeds transmitted to two or more of said plurality of nodes within a common dependency chain.

15. The wireless remote monitoring system of claim 14 wherein said one or more pseudo-randomly generated seeds includes at least one of (i) channel or frequency information and (ii) timing information.

16. The wireless remote monitoring system of claim 11 wherein each of said plurality of nodes comprises at least an enclosure, power source, battery, controller, antenna and radio.

17. The wireless remote monitoring system of claim 11 wherein each of said plurality of nodes are equipped with a GPS receiver configured to determine location data such as latitude, longitude and altitude.

18. The wireless remote monitoring system of claim 11 wherein each of said plurality of nodes are positioned on utility poles, utility towers and/or trees.

19. The wireless remote monitoring system of claim 18 wherein a density of said plurality of nodes includes a node positioned no more than ½ mile from a neighboring node within a subject geographic region.

20. The wireless remote monitoring system of claim 11 wherein said gateway node is configured to communicate with said plurality of nodes and said central computer via a satellite link and/or cellular link.

21. The wireless remote monitoring system of claim 16 wherein said power source is an AC power supply, one or more solar panels, wind power generator and/or powerline inductive energy.

22. The wireless remote monitoring system of claim 17 wherein said GPS receiver is configured to receive PPS information from orbiting satellites that may be used to synchronize radio transmission and reception.

23. A method monitoring utility wires, comprising:
positioning a plurality of nodes proximate to utility wires to be monitored, each of said nodes including integrated sensors configured to collect data relative to environmental factors;
configuring each of said plurality of nodes to transmit and receive collected data from at least one other node from amongst said plurality of nodes;
utilizing a central computer maintaining a database, said database for storing said collected data relative to environmental factors;
establishing a communication link between said plurality of nodes and said central computer, said communication link configured to transmit said collected data from said integrated sensors to said central computer for evaluation;
configuring said central computer to evaluate said collected data to determine environmental conditions proximate utility support structures such that selective electrical utilities may be shut down if said environmental conditions pose a risk to said utility support structure; and
further comprising utilizing frequency hopping via a fixed, pre-established set of channels or frequencies wherein any gateway node and subsequent layer of nodes within a common dependency chain communicate on the same channel or frequency within said pre-established set of channels or frequencies for a period of time before changing to a next channel or frequency within said pre-established number of channels or frequencies.

24. The method of claim 23 further comprising configuring at least one node as a gateway node.

25. The method of claim 23 further comprising configuring one or more internal clocks to facilitate said change to a different channel or frequency within said pre-established number of channels or frequencies.

26. The method of claim 23 further comprising rerouting communications around any failed nodes.

27. The method of claim 23 further comprising incorporating a GPS receiver with said plurality of nodes.

28. The method of claim 23 further comprising utilizing a gateway node, satellite link and/or cellular link as part of said communication link.

29. The method of claim 23 further comprising positioning each of said plurality of nodes no more than ½ mile from a neighboring node within a subject geographic region.

30. The method of claim 23 further comprising resetting a subject node responsive to a failure of communication with said subject node.

31. The method of claim 23 further comprising utilizing GPS receivers configured to receive PPS information from orbiting satellites used to synchronize radio transmission and reception.

32. The method of claim 23 further comprising causing one or more of said nodes to enter a suspended state to conserve energy.

33. A method monitoring utility wires, comprising:
positioning a plurality of nodes each including integrated sensors configured to collect data relative to environmental factors, said plurality of nodes positioned on a plurality of utility support structures comprising at least utility poles, utility towers and/or trees, each of said nodes including at least an enclosure, power source, battery, controller, antenna and radio;
configuring each of said plurality of nodes to transmit and receive collected data from at least one other node from amongst said plurality of nodes;
configuring a central computer for (i) maintaining a database, said database for storing said collected data relative to environmental factors; (ii) receiving signals from said plurality of nodes related to said collected data; (iii) evaluating said collected data to determine environmental conditions proximate said utility support structures; and (iv) shutting down any utilities responsive to said environmental conditions posing a risk to said utility support structure; and
utilizing frequency hopping via a pre-established set of channels or frequencies wherein any gateway node and subsequent layer of nodes within a common dependency chain communicate on the same channel or frequency within said pre-established set of channels or frequencies for a period of time before pseudo-randomly changing to another channel or frequency within said pre-established number of channels or frequencies.

34. The method of claim 33 further comprising configuring at least one node as a gateway node.

35. The method of claim 33 further comprising configuring one or more internal clocks to facilitate said pseudo-random change to a different channel or frequency within said pre-established number of channels or frequencies.

36. The method of claim 33 further comprising transmitting one or more pseudo-randomly generated seeds to two or more of said plurality of nodes within a common dependency chain.

37. The method of claim 36 further comprising configuring said one or more pseudo-randomly generated seeds to include at least one of (i) channel or frequency information and (ii) timing information.

38. The method of claim 33 further comprising rerouting communications around any failed nodes.

39. The method of claim 33 further comprising rerouting communications around any failed nodes.

40. The method of claim 33 further comprising incorporating a GPS receiver with said plurality of nodes.

41. The method of claim 33 further comprising utilizing a gateway node, satellite link and/or cellular link as part of said communication link.

42. The method of claim 33 further comprising positioning each of said plurality of nodes no more than ½ mile from a neighboring node within a subject geographic region.

43. The method of claim 33 further comprising resetting a subject node responsive to a failure of communication with said subject node.

44. The method of claim 33 further comprising utilizing GPS receivers configured to receive PPS information from orbiting satellites used to synchronize radio transmission and reception.

45. The method of claim 33 further comprising causing one or more of said nodes to enter a suspended state to conserve energy.

* * * * *